(12) United States Patent
Tarighat Mehrabani

(10) Patent No.: US 9,197,466 B2
(45) Date of Patent: Nov. 24, 2015

(54) RADIO FREQUENCY CARRIER GENERATION ARCHITECTURE

(71) Applicant: Broadcom Corporation, Irvine, CA (US)

(72) Inventor: Alireza Tarighat Mehrabani, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 119 days.

(21) Appl. No.: 14/058,160

(22) Filed: Oct. 18, 2013

(65) Prior Publication Data

US 2015/0103872 A1    Apr. 16, 2015

Related U.S. Application Data

(60) Provisional application No. 61/889,831, filed on Oct. 11, 2013.

(51) Int. Cl.
*H04L 27/00* (2006.01)
(52) U.S. Cl.
CPC ......... *H04L 27/00* (2013.01); *H04L 2027/0026* (2013.01); *H04L 2027/0067* (2013.01)
(58) Field of Classification Search
CPC ................ H04L 2027/0026; H04L 2027/0067

USPC .................................................. 375/219, 375
See application file for complete search history.

(56) References Cited

U.S. PATENT DOCUMENTS

| 7,962,108 B1 * | 6/2011 | Khlat et al. | 455/114.3 |
| 8,643,414 B1 * | 2/2014 | Navid | 327/156 |
| 2011/0304357 A1 * | 12/2011 | Tokairin | 327/12 |

* cited by examiner

*Primary Examiner* — Michael Neff
(74) *Attorney, Agent, or Firm* — McDermott Will & Emery LLP

(57) ABSTRACT

A method of compensating carrier tone generation between duty cycles includes receiving a carrier frequency signal and a reference frequency signal, where the carrier frequency signal is mixed with a communication signal in a signal path. The method includes determining a first and second time differences between the carrier frequency signal and the reference frequency signal at respective clock edges of the reference frequency signal. The method includes converting the first time difference to a first corresponding phase value and the second time difference to a second corresponding phase value based on an operating frequency, and determining a phase difference between the first corresponding phase value and the second corresponding phase value. In turn, the method includes adjusting the communication signal with the phase difference independent of the signal path to maintain phase continuity in the signal path between the duty cycles.

20 Claims, 6 Drawing Sheets

RADIO FREQUENCY CARRIER GENERATION ARCHITECTURE

CROSS-REFERENCE TO RELATED APPLICATIONS

The present application claims the benefit of U.S. Provisional Patent Application Ser. No. 61/889,831, titled "RADIO FREQUENCY CARRIER GENERATION ARCHITECTURE," filed on Oct. 11, 2013, which is hereby incorporated by reference in its entirety for all purposes.

TECHNICAL FIELD

The present description relates to radio frequency communication systems, and more particularly, but not exclusively, to carrier tone generation.

BACKGROUND

In cellular radios, radio frequency (RF) carrier generation modules (e.g., phase-locked loops (PLLs)) are consuming about 35% of an entire radio current budget and around 25% of an entire transceiver current budget. In conventional approaches, the RF carrier generation modules are kept powered on even when the remainder of the transceiver is duty-cycled since the PLLs need to maintain phase continuity between duty cycles. Without phase continuity, the transceiver would have to reacquire a sampling offset and a carrier phase. The reacquisition of the sampling offset and carrier phase causes the transceiver to (1) consume more time thus translating to additional power consumption, and 2) require a certain packet format that may not be compatible with a standard.

BRIEF DESCRIPTION OF THE DRAWINGS

Certain features of the subject technology are set forth in the appended claims. The accompanying drawings, which are included to provide further understanding, illustrate disclosed aspects and together with the description serve to explain the principles of the disclosed aspects. In the drawings:

DETAILED DESCRIPTION

Figure 1:
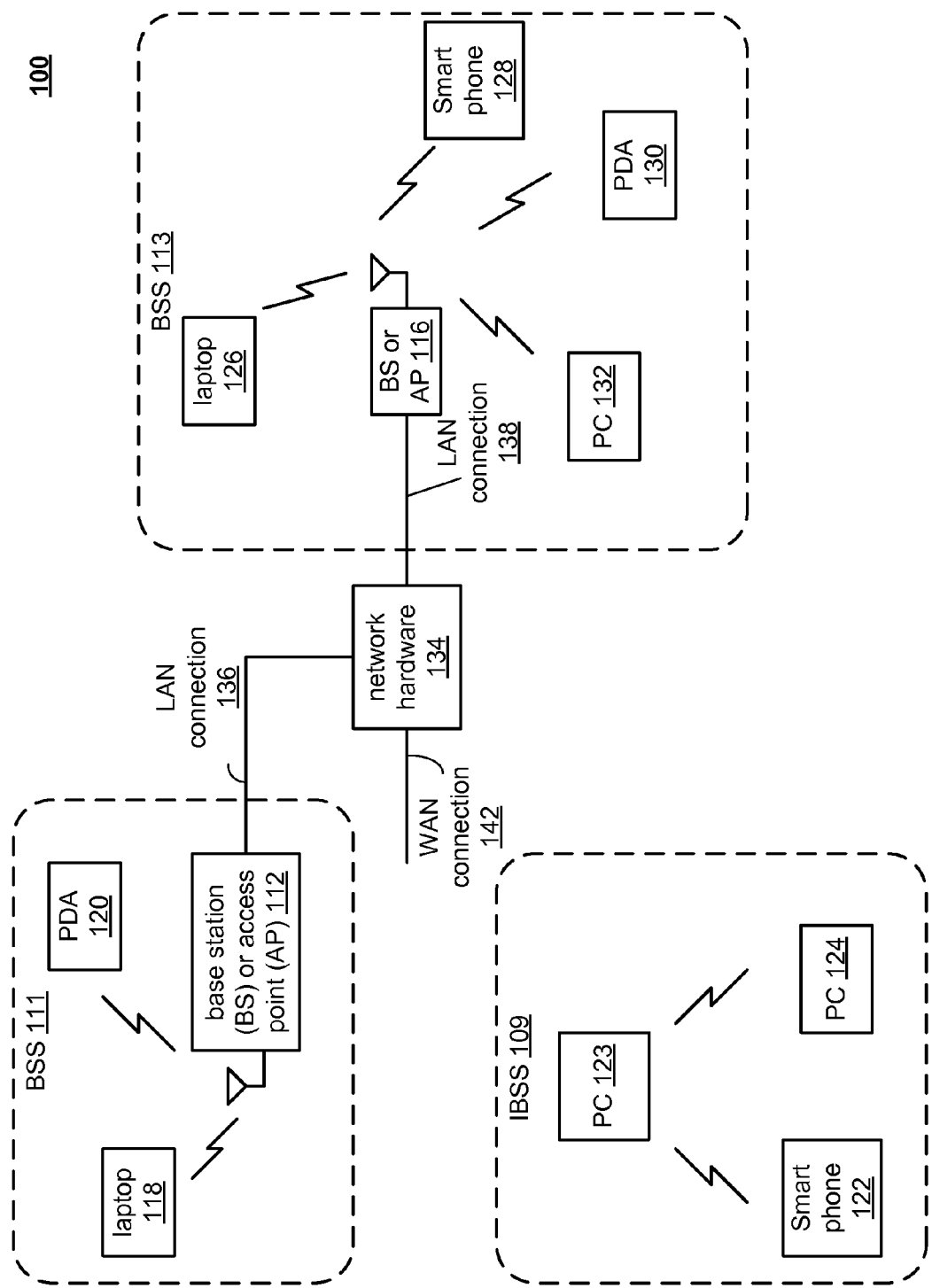
FIG. 1 is a diagram illustrating a wireless communication system in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of these specific details. In one or more instances, structures and components are shown in block diagram form in order to avoid obscuring the concepts of the subject technology.

When the PLLs are duty-cycled, the PLLs need to maintain effective "phase continuity" between the end of an ON cycle and the start of a next ON cycle even though PLL components may be switched off in between. Without phase continuity, a modem would have to reacquire the "sampling offset" (e.g., the phase of clock supplied to analog-to-digital/digital-to-analog converters) and "carrier phase" (e.g., the phase of carrier provided for up-conversion/down-conversion), for example. As such, expecting the modem to reacquire the "sampling offset" and "carrier phase" makes the overall scheme less practical. The aforementioned approach applies to both transmitter (TX) and receiver (RX) paths (e.g., TX and RX PLLs). Hence, there is a need to eliminate the reacquisition of the "carrier phase" and "sampling offset" by the modem since maintaining phase continuity without the reacquisition becomes a fundamental enabler for achieving efficient duty-cycling and ON/OFF switching (including enablement of low power applications).

In some aspects, a method of compensating carrier tone generation (e.g., the sampling offset and/or the carrier phase) between duty cycles includes receiving a carrier frequency signal from a PLL and a reference frequency signal from a crystal oscillator (sometimes referred to as a reference clock generator). In some aspects, a communication signal such as an incoming RF signal is mixed with the carrier frequency signal to provide an inbound baseband signal in a signal path (e.g., down-conversion path or RX path). In certain aspects, the communication signal is represented as an outbound baseband signal in an up-conversion path (or TX path). The method includes determining a first time difference between the carrier frequency signal and the reference frequency signal during a first ON cycle of a duty-cycle sequence, and a second time difference between the carrier frequency signal and the reference frequency signal during a second ON cycle of the duty-cycle sequence that is subsequent to the first ON cycle. The method then includes converting the first time difference to a first corresponding phase value and the second time difference to a second corresponding phase value based on an operating frequency of the PLL. The method then includes determining a phase difference between the first corresponding phase value and the second corresponding phase value. Once the phase difference is determined, the method then includes adjusting the communication signal with the phase difference in parallel of the RX and TX paths (e.g., independent of the up-conversion/down-conversion paths) to maintain phase continuity in the signal path between duty cycles. In this respect, the subject technology provides for eliminating the need of reacquiring the carrier phase and/or the sampling offset by compensating for any phase difference in the signal path between duty cycles.

FIG. 1 is a diagram illustrating wireless communication system 100 in accordance with one or more implementations. Wireless communication system 100 includes base stations and/or access points 112, 116, wireless communication devices 118-132 and a network hardware component 134. Note that the network hardware 134, which may be a router, switch, bridge, modem, or system controller, provides a wide area network connection 142 for the wireless communication system 100. Wireless communication devices 118-132 may be laptop host computers 118 and 126, personal digital assistant hosts 120 and 130, personal computer hosts 124 and 132 and/or cellular telephone hosts (sometimes referred to as smart phones) 122 and 128.

Wireless communication devices 122, 123, and 124 are located within independent basic service set (IBSS) area 109 and communicate directly (e.g., point to point). In this configuration, wireless communication devices 122, 123, and 124 may only communicate with each other. To communicate with other wireless communication devices within the wireless communication system 100 or to communicate outside of the wireless communication system 100, wireless communication devices 122, 123, and/or 124 can affiliate with one of the base stations or access points 112 or 116.

The base stations or access points 112, 116 are located within basic service set (BSS) areas 111 and 113, respectively, and are operably coupled to the network hardware 134 via local area network connections 136, 138. Such a connection provides the base station or access points 112, 116 with connectivity to other devices within the wireless communication system 100 and provides connectivity to other networks via the WAN connection 142. To communicate with wireless communication devices 118-132 within BSS 111 and 113, each of the base stations or access points 112, 116 has an associated antenna or antenna array. In one or more implementations, base station or access point 112 wirelessly communicates with wireless communication devices 118 and 120 while base station or access point 116 wirelessly communicates with wireless communication devices 126-132. Wireless communication devices 118-132 can register with a particular base station or access point 112, 116 to receive services from the wireless communication system 100.

According to some implementations, base stations are used for cellular telephone systems (e.g., advanced mobile phone services (AMPS), digital AMPS, global system for mobile communications (GSM), code division multiple access (CDMA), local multi-point distribution systems (LMDS), Long Term Evolution (LTE), multi-channel-multi-point distribution systems (MMDS), enhanced data rates for GSM evolution (EDGE), general packet radio service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth®, ZigBee, any other type of radio frequency based network protocol and/or variations thereof). Regardless of the particular type of communication system, each wireless communication device includes a built-in radio and/or is coupled to a radio.

As wireless systems (e.g., LTE, WLAN) facilitate increasing peak data rates, connections directed to low-power applications are increasing in demand. Efficient duty-cycling of a very high-throughput connection can be implemented to provide a lower-throughput connection with more energy-per-bit efficiency. For example, a duty cycle of 10% can translate to a radio/analog/digital chain in a transceiver (e.g., wireless communication devices 122-132 of FIG. 1) being switched off for 90% of the usage time. During peak rates with the duty cycle of 10%, the electrical current consumption of the radio/analog/digital chain would not scale up by a large number. Rather, the radio/analog/digital chain would achieve an average power consumption that is one-tenth of the peak power consumption with an effective throughput equal to one-tenth of the peak rate. By way of example, an 802.11ac connection that is optimized and duty-cycled to provide a throughput equal to an 802.11n connection can deliver that throughput (e.g., equal to one-tenth of the peak rate) with lower effective power consumption.

In addition, the need to substantially lower the effective power consumption of an LTE connection when used in voice-over-LTE (VOLTE) mode becomes a challenge to commercialize VOLTE. While VOLTE requires significantly less throughput than what can be achieved by LTE, the power consumption needs to be significantly optimized through more aggressive and efficient duty-cycling (e.g., to make VOLTE comparable to 3G CDMA voice). There is an increasing trend to implement low-power LTE systems as more service providers consider discontinuing 2G and 3G CDMA services and re-farming those spectrums for the low-power LTE services. An additional motivation for more efficient short connectivity cycles is to optimize the power consumption of applications running on mobile devices such as smartphones (e.g., wireless communication devices 122 and 128 of FIG. 1). Applications, such as messaging, chatting, periodic fetching, browsing, and alerts, can benefit significantly from efficient short and periodic ON cycles.

The subject disclosure provides a radio frequency carrier tone generation architecture directed to low-power wireless communication technologies (e.g., long term evolution (LTE), wireless local area network (WLAN)) and connectivity. The subject technology provides for efficient duty-cycling by allowing RF carrier generation modules (e.g., PLLs, VCOs) to be switched off during OFF cycles while maintaining phase continuity between ON cycles. The PLLs can be switched on at the beginning of an ON cycle and lock/settle to a proper frequency. Measurements can be taken in between the ON cycles to determine any phase difference without any impact or disruption of the PLL and/or the TX/RX paths. In this respect, the need of reacquiring the carrier phase and the sampling offset can be eliminated since any phase difference in the TX/RX paths between duty cycles can be compensated for in parallel to the carrier tone generation.

Figure 2:
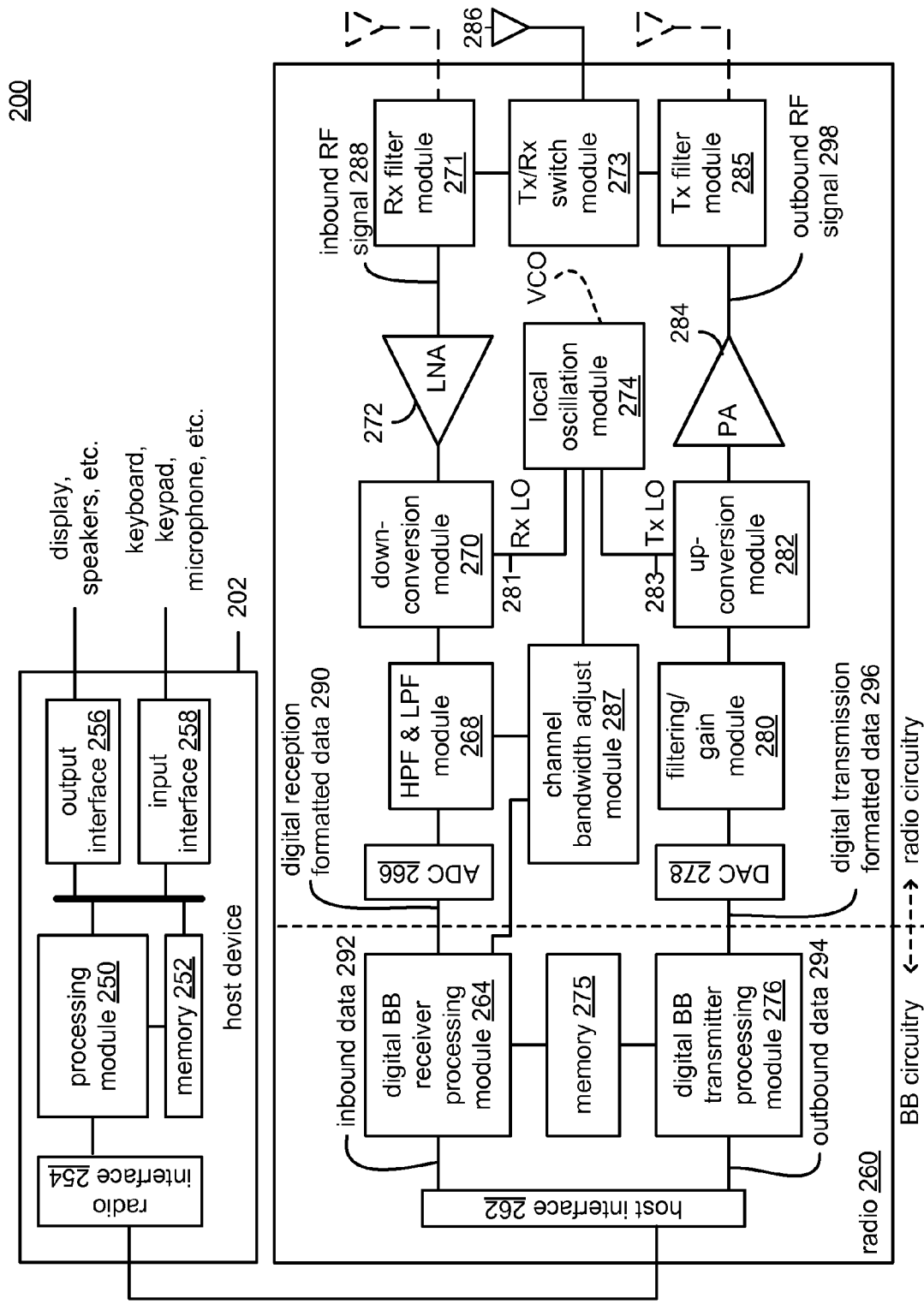
FIG. 2 is a diagram illustrating a wireless communication device that includes a host device and an associated radio in accordance with one or more implementations.

FIG. 2 is a diagram illustrating a wireless communication device 200 that includes a host device 202 (e.g., wireless communication devices 118-132) and associated radio 260 in accordance with one or more implementations. For cellular telephone hosts, radio 260 is a built-in component. For personal digital assistants hosts, laptop hosts, and/or personal computer hosts, the radio 260 may be built-in or an externally coupled component.

As illustrated, host device 202 includes processing module 250, memory 252, radio interface 254, input interface 258, and output interface 256. Processing module 250 is configured to execute corresponding instructions stored in memory 275 that can be performed by host device 202. For example, for a cellular telephone host device, processing module 250 performs the corresponding communication functions in accordance with a particular cellular telephone standard.

Radio interface 254 allows data to be received from and sent to radio 260. For data received from the radio 260 (e.g., inbound data), radio interface 254 provides the data to processing module 250 for further processing and/or routing to output interface 256. Output interface 256 provides connectivity to an output display device such as a display, monitor, or speakers, such that the received data may be presented. Radio interface 254 also provides data from processing module 250 to radio 260. Processing module 250 may receive the outbound data from an input device such as a keyboard, keypad, or microphone via input interface 258 or generate the data itself. For data received via input interface 258, processing module 250 may perform a corresponding host function on the data and/or route it to radio 260 via radio interface 254.

Radio 260 includes host interface 262, digital baseband (BB) receiver processing module 264, analog-to-digital converter 266, high pass and low pass filter module 268, interfrequency (IF) mixing down conversion stage 270, receiver filter module 271, low noise amplifier 272, transmitter/receiver switch 273, local oscillation module 274 (which may be implemented, at least in part, using a voltage controlled oscillator (VCO)), memory 275, digital BB transmitter processing module 276, digital-to-analog converter 278, filtering/gain module 280, intermediate frequency (IF) mixing up-conversion stage 282, power amplifier 284, transmitter filter module 285, channel bandwidth adjust module 287, and antenna 286. Antenna 286 may be a single antenna that is shared by the transmit and receive paths as regulated by Tx/Rx switch module 273, or may include separate antennas for the transmit path and receive path. The antenna implementation will depend on the particular standard to which the wireless communication device is compliant.

Digital receiver processing module 264 and digital transmitter processing module 276, in combination with operational instructions stored in memory 275, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion.

Digital receiver and transmitter processing modules 264 and 276 may be implemented using a shared processing device, individual processing devices, or multiple processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 275 may be a single memory device or multiple memory devices. Such a memory device may be a read-only memory, random access memory, volatile memory, non-volatile memory, static memory, dynamic memory, flash memory, and/or any device that stores digital information. Note that when processing module 264 and/or 276 implements one or more of its functions via a state machine, analog circuitry, digital circuitry, and/or logic circuitry, the memory storing the corresponding operational instructions is embedded with the circuitry including the state machine, analog circuitry, digital circuitry, and/or logic circuitry.

In operation, radio 260 receives outbound data 294 from host device 202 via host interface 262. Host interface 262 routes outbound data 294 to digital transmitter processing module 276, which processes outbound data 294 in accordance with a particular wireless communication standard (e.g., IEEE 802.11, Bluetooth, ZigBee, WiMAX (Worldwide Interoperability for Microwave Access), or any other type of radio frequency based network protocol and/or variations thereof) to produce outbound baseband signals 296. Outbound baseband signals 296 can be digital baseband signals (e.g., have a zero IF) or digital low IF signals, where the low IF can be in the frequency range of one hundred kHz (kiloHertz) to a few MHz (Mega-Hertz).

Digital-to-analog converter 278 converts outbound baseband signals 296 from the digital domain to the analog domain. Filtering/gain module 280 filters and/or adjusts the gain of the analog signals prior to providing the signals to IF mixing stage 282. IF mixing stage 282 converts the analog baseband or low IF signals into radio frequency (RF) signals based on transmitter local oscillation 283 provided by local oscillation module 274. Power amplifier 284 amplifies the RF signals to produce outbound RF signals 298, which are filtered by transmitter filter module 285. Antenna 286 transmits outbound RF signals 298 to a targeted device such as a base station, an access point and/or another wireless communication device.

Radio 260 also receives inbound RF signals 288 via antenna 286, which are transmitted by a base station, an access point, or another wireless communication device. Antenna 286 provides inbound RF signals 288 to receiver filter module 271 via Tx/Rx switch 273, where Rx filter 271 bandpass filters inbound RF signals 288. Rx filter 271 provides the filtered RF signals to low noise amplifier 272, which amplifies inbound RF signals 288 to produce amplified inbound RF signals. Low noise amplifier 272 provides the amplified inbound RF signals to IF mixing module 270, which directly converts the amplified inbound RF signals into an inbound low IF signals or baseband signals based on receiver local oscillation 281 provided by local oscillation module 274. Down conversion module 270 provides the inbound low IF signals or baseband signals to filtering/gain module 268. High pass and low pass filter module 268 filters, based on settings provided by channel bandwidth adjust module 287, the inbound low IF signals or the inbound baseband signals to produce filtered inbound signals.

Analog-to-digital converter 266 converts the filtered inbound signals from the analog domain to the digital domain to produce inbound baseband signals 290, where inbound baseband signals 290 will be digital base-band signals or digital low IF signals, where the low IF typically will be in the frequency range of one hundred kHz to a few MHz. Digital receiver processing module 264, based on settings provided by channel bandwidth adjust module 287, decodes, descrambles, demaps, and/or demodulates inbound baseband signals 290 to recapture inbound data 292 in accordance with the particular wireless communication standard being implemented by radio 260. Host interface 262 provides recaptured inbound data 292 to host device 202 via radio interface 254.

Wireless communication device 200 may be implemented using one or more integrated circuits. For example, the host device 202 may be implemented on a first integrated circuit, digital receiver processing module 264, digital transmitter processing module 276 and memory 275 may be implemented on a second integrated circuit, and the remaining components of radio 260, less antenna 286, may be implemented on a third integrated circuit. Alternatively, radio 260 may be implemented on a single integrated circuit. As yet another example, processing module 250 of host device 202 and digital receiver and transmitter processing modules 264 and 276 may be a common processing device implemented on a single integrated circuit. Further, memory 252 and memory 275 may be implemented on a single integrated circuit and/or on the same integrated circuit as the common processing modules of processing module 250 and digital receiver and transmitter processing module 264 and 276.

Any of the various embodiments of the wireless communication device 200 that may be implemented within various communication systems can incorporate functionality to perform communication via more than one standard, protocol, or other predetermined means of communication. For example, the wireless communication device 200 implemented as a single communication device, can include functionality to perform communication in accordance with a first protocol, a second protocol, and/or a third protocol. These various protocols may be WiMAX (Worldwide Interoperability for Microwave Access) protocol, a protocol that complies with a wireless local area network (e.g., WLAN/WiFi) (e.g., one of the IEEE (Institute of Electrical and Electronics Engineer) 802.11 protocols such as 802.11a, 802.11b, 802.11g, 802.11n, 802.11ac or 802.11ad), a Bluetooth® protocol, or any other predetermined means by which wireless communication may be effectuated.

In some aspects, local oscillation module 274 may include a phase-locked loop (PLL), a time-to-digital converter (TDC) module and a crystal oscillator (e.g., local oscillator). The PLL may be configured to receive a reference frequency signal from the crystal oscillator, and output a carrier frequency signal based on the reference frequency signal. The carrier frequency signal may be mixed with a communication signal (e.g., RF signal in a RX path, baseband signal in a TX path) in a signal path (e.g., the transmit and/or receive paths) to provide a mixed signal (e.g., inbound baseband signal in the RX path, outbound RF signal in the TX path). The TDC module may be coupled to an output of the PLL and an output of the crystal oscillator to allow the TDC module to operate independent of the TX/RX paths through the ADCs/DACs (e.g., ADC 266, DAC 278). The TDC module may be configured to receive the carrier frequency signal from the PLL and the reference frequency signal from the crystal oscillator. In this respect, the TDC module may determine a first and second time differences between the carrier frequency signal and the reference frequency signal. The first and second time differences may correspond to respective duty cycles (e.g., ON cycles). In turn, the TDC module may convert the first time difference to a first corresponding phase value and the second time difference to a second corresponding phase value based on an operating frequency (or clock cycle) of the PLL. The TDC module may then determine a phase difference between the first corresponding phase value and the second corresponding phase value before outputting the phase difference to a modem (not shown) independent of the signal path (e.g., the digital reception formatted data 290, the digital transmission formatted data 296). In some aspects, the TDC module adjusts the baseband signal with the phase difference independent of the signal path by mixing the phase difference with an input to the modem or an output from the modem depending on implementation.

Based on the foregoing, the subject technology provides for efficient duty-cycling by allowing RF carrier generation modules (e.g., local oscillation module 274) to be switched off during OFF cycles while maintaining phase continuity between ON cycles. The local oscillation module 274 can be switched on at the beginning of an ON cycle and lock/settle to a proper frequency. Measurements can be taken in between the ON cycles to determine any phase difference without any impact or disruption of the local oscillation module 274 and/or the TX/RX paths. In this respect, the need of reacquiring the carrier phase and the sampling offset can be eliminated since any phase difference in the TX/RX paths between duty cycles can be compensated for in parallel to the carrier tone generation of the PLL.

Figure 3:
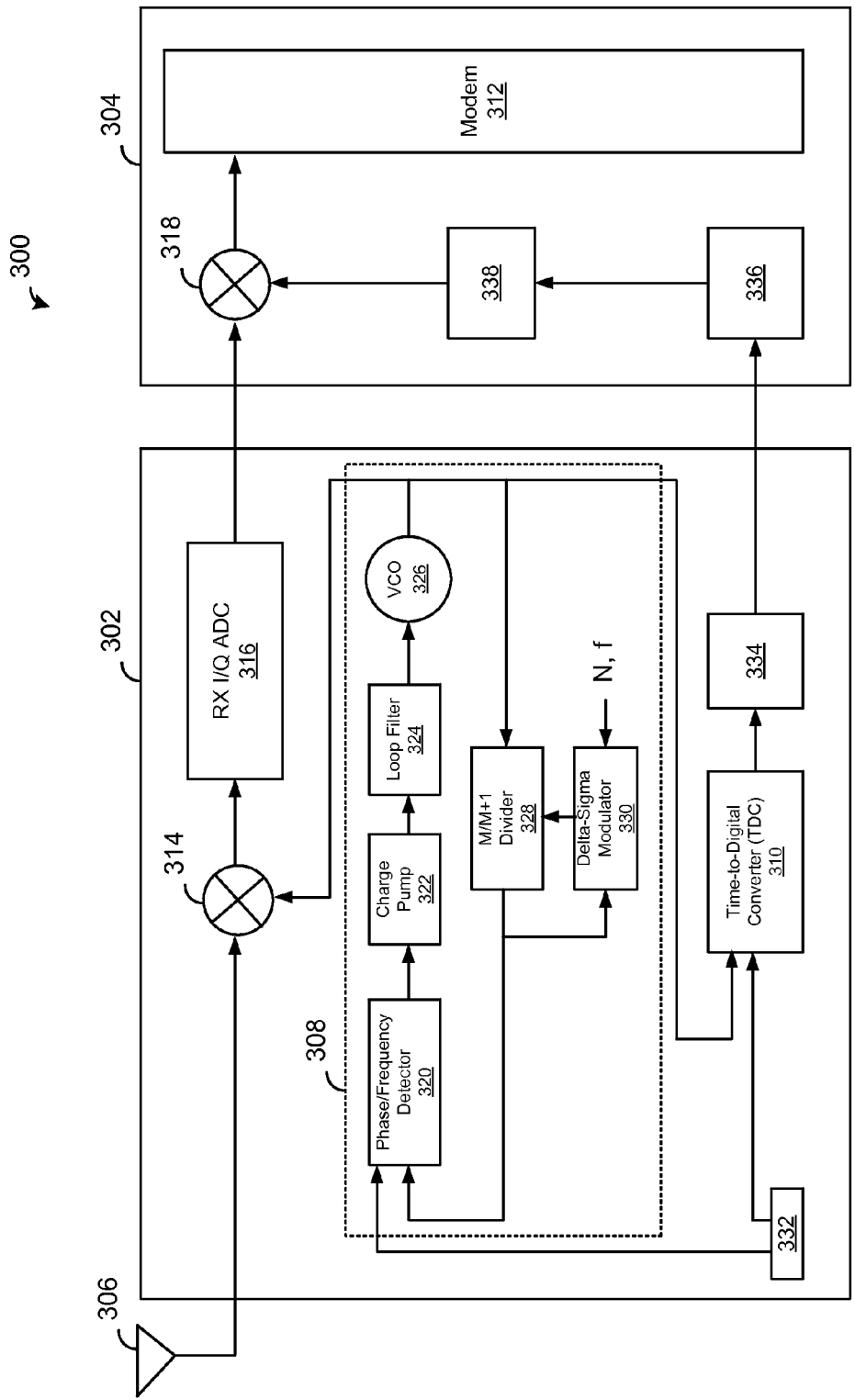
FIG. 3 is a block diagram illustrating an example of a receiver with phase uncertainty compensation in accordance with one or more implementations.

FIG. 3 is a block diagram illustrating an example of a receiver 300 with phase uncertainty compensation in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The receiver 300 includes a radio frequency (RF) front-end 302, a modem 304 and an antenna 306. The RF front-end 302 includes a PLL 308, a time-to-digital converter (TDC) module 310, a mixer 314, an analog-to-digital converter (ADC) 316 and a crystal oscillator 332 (sometimes referred to as a reference clock generator). In some aspects, the RF front-end 302 represents the radio circuitry portion of the radio 260 of FIG. 2 such that the mixer 314 represents the down-conversion module 270, the PLL 308 represents a portion of the local oscillation module 274 and the ADC 316 represents the ADC 266. The PLL 308 includes a phase/frequency detector (PFD) 320, a charge pump 322, a loop filter 324, a voltage-controlled oscillator (VCO) 326, a frequency divider 328, and a modulator 330. The modem 304 includes a standard modem 312 and a mixer 318 with the input of the mixer 318 coupled to the output of the ADC 316, and the output of the mixer 318 coupled to the input of the standard modem 312.

As shown in FIG. 3, an input of the ADC 316 is coupled to an output of the mixer 314. In certain aspects, an output of the ADC 316 is coupled to an input of the mixer 314. The RF front-end 302 may be integrated with the modem 304 on a same die circuit. Depending on implementation, the PLL 308, the mixer 314, the ADC 316, and the reference clock generator 332 may be integrated onto a single chip or die (e.g., a radio frequency integrated circuit). The components integrated onto the radio frequency integrated circuit can be implemented using system-on-chip (SOC).

The PLL 308 is coupled to an output of the reference clock generator 332, the TDC module 310 is coupled to an output of the PLL 308 and an input of the modem 304. The TDC module 310 is also coupled to the output of the reference clock generator 332. The RF front-end 302 is coupled to the antenna 306 that is configured to receive an RF signal from a transmitter source. The TDC module 310 may operate in parallel to the PLL 308, without any impact or disruption on the PLL 308 operation or performance. In some implementations, the PLL 308 is an all-digital PLL (ADPLL). In this respect, the PLL 308 may contact one or more TDC modules. However, the TDC module 310, which is outside of or in parallel to the PLL 308, can have a different function or purpose than the TDC modules inside the PLL 308. The TDC modules inside the PLL 308, for example, may be implemented to complete the ADPLL loop, whereas the TDC module 310 (e.g., outside of the PLL 308) can be used to provide an independent measurement of phase/time to be used by the modem 304 for purposes of maintaining phase continuity between duty cycles.

In operation, the RF front-end 302 receives an incoming RF signal (via the antenna 306) that may include In-phase (I) and Quadrature (Q) component signals for processing in the signal path. In some aspects, the RF front-end 302 includes a low-pass filter (not shown). In turn, the analog version of the incoming RF signal may be filtered through the low-pass filter to attenuate any frequency components of the respective component of the incoming RF signal that are present outside a defined bandwidth.

The PLL 308 receives a reference frequency signal from the reference clock generator 332 and outputs a carrier frequency signal (e.g., a local oscillator signal for mixing with the I and Q component signals) based on the reference frequency signal. In some aspects, the output of the VCO 326 (e.g., the carrier frequency signal) becomes the RF carrier frequency used for down-conversion in a signal path (e.g., main I/Q receive path from the antenna 306 to the modem 304).

The mixer 314 down-converts the I and Q component signals to a baseband frequency (e.g., a baseband signal) that is lower (or substantially lower) in frequency than the incoming RF signal. In this regard, the baseband signal can be operable at baseband frequencies (e.g., 1 MHz). In turn, each of the I and Q component signals carried in the signal path may be converted from the analog domain to the digital domain by analog-to-digital converter 316. The modem 304 may be configured to receive the digital baseband signal that is down-converted from the incoming RF signal (e.g., mixed with the carrier frequency signal) in the signal path.

In certain aspects, the PLL 308 is a closed-loop system based on the phase difference between an input clock signal (e.g., the reference frequency signal) and a feedback from the output of the VCO 326. The PFD 320 is configured to detect a difference in phase and frequency between the reference frequency signal and the VCO feedback, and generate a detection signal based on whether the VCO feedback is lagging or leading the reference frequency signal.

The charge-pump 322 may be configured to drive current into or draw current from the loop filter 324 based on the detection signal. For example, if the detection signal has an indication to increase the VCO feedback frequency, then the charge pump 322 drives current proportionate to the indicated increase. Conversely, if the detection signal has an indication to decrease the VCO feedback frequency, then the charge pump 322 draws current proportionate to the indicated decrease.

The loop filter 324 may be configured to convert the detection signal into a control voltage that is used to bias the VCO 326. The loop filter 324 can be configured to remove glitches from the charge-pump and prevent voltage overshoot. In one or more implementations, loop filter 324 is a low-pass filter that attenuates frequency components outside a given bandwidth. The control voltage determines whether the VCO 326 needs to operate at a higher or lower frequency, which affects the phase and frequency of the VCO feedback. The VCO 326 may be configured to receive the control voltage signal 206 and generate the carrier frequency signal. If the detection signal indicates an increase, then the VCO frequency increases. Conversely, if the detection signal indicates a decrease, then the VCO frequency decreases. The VCO 326 stabilizes once the reference frequency signal and the VCO feedback have the same phase and frequency. In this regard, the PLL 308 is considered locked when the reference frequency signal and the VCO feedback are aligned.

The frequency divider 328 is configured to increase the VCO frequency (or VCO feedback frequency) above the reference frequency by some integer multiple (e.g., M/M+1). That is, the VCO frequency is equal to (M/M+1) times the reference frequency signal. Therefore, the VCO feedback feeding one input of the PFD 320 is locked to the frequency-divided signal applied to the other input of PFD 320.

As shown in FIG. 3, the TDC module 310 is configured to operate in parallel to the PLL 308 and the signal path. In this respect, the TDC module 310 output does not impact or interfere with the operation of the VCO 326 to the modem 304 since the TDC module 310 is configured to provide an output to the modem 304 independent of the signal path through the ADC 316. As a result, measurements such as the arbitrary phase of the VCO 326 output can be taken at the start of each duty cycle (e.g., ON cycle) to determine any phase difference without any impact or disruption of the PLL 308 and/or the RX path through the ADC 316. The need of reacquiring the carrier phase and the sampling offset can be eliminated since any phase difference between duty cycles can be compensated for at the modem 304 in parallel to the carrier tone generation by the PLL 308 via the RX path.

The TDC module 310 may include two inputs, in which a first input represents the reference frequency signal input from the output of the clock reference generator 332 and a second input represents the carrier frequency signal input from the output of the VCO 326. In some aspects, the TDC module 310 is configured to determine first and second time differences between the carrier frequency signal and the reference frequency signal at respective clock edges of the reference frequency signal. The TDC module 310 then converts the first time difference to a first corresponding phase value and the second time difference to a second corresponding phase value based on an operational clock cycle (or frequency) of the VCO 326. The TDC module 310 then determines a phase difference between the first corresponding phase value and the second corresponding phase value. Once the phase difference is determined, the TDC module 310 can adjust the baseband signal with the phase difference without any impact or disruption of the PLL 308 and/or the RX path through the ADC 316, and thus, eliminate the need to reacquire the carrier phase and the sampling offset by the modem 304 since any phase difference between duty cycles can be compensated for at the input to the standard modem 312.

When the PLL is switched off upon entering an OFF cycle, the output of the TDC module may be recorded as a measure of a VCO phase with a corresponding time stamp. In this respect, the VCO phase measured at the end of the previous ON cycle represents the first time difference. When the PLL is switched on again to enter an ON cycle (e.g., transition from a previous OFF cycle to a current ON cycle), the output of the TDC module 310 is recorded again as a measure of the VCO phase with a corresponding time stamp. In this respect, the VCO phase measured at the beginning of the current ON cycle represents the second time difference. The reference frequency signal may be used for timing reference/stamping of the aforementioned duty cycling events. Using the phase difference of the VCO outputs (e.g., between the end of a previous ON cycle and beginning of the current ON cycle), the time difference between the end of the previous ON cycle and beginning of the current ON cycle based on the reference frequency signal, and the operating frequency of the VCO, an effective phase delta (e.g., $\Delta\phi$) can be determined that can be used to compensate for any phase difference detected between the previous ON cycle and the current ON cycle. In turn, the effective phase delta can be mixed with the baseband signal carried in the signal path to generate a compensated baseband signal with the phase difference at the input of the modem 304.

In certain aspects, multiple samples of the carrier frequency signal can be measured at several consecutive edges (e.g., positive clock transition) of the reference frequency signal. In turn, the TDC module 310 output can be filtered, processed or averaged. By way of example, the TDC module 310 may be configured to determine multiple first time measurements between the carrier frequency signal and the reference frequency signal, where each of the first time measurements is determined at a respective clock transition of the reference frequency signal within the first ON cycle (or previous ON cycle). In turn, the TDC module 310 may be configured to determine a first average value between the first time measurements, in which the first corresponding phase value is based on the first average value.

Similarly, the TDC module 310 may be configured to determine multiple second time measurements between the carrier frequency signal and the reference frequency signal, where each of the second time measurements is determined at a respective clock transition of the reference frequency signal within the second ON cycle (or current ON cycle). In turn, the TDC module 310 may be configured to determine a second average value between the second time measurements, in which the second corresponding phase value is based on the second average value.

In some implementations, similar uncertainty can exist on a clock employed as an ADC 316 clock along the main I/Q receive path for sampling the incoming baseband data. The TDC module 310 may be employed to estimate a phase uncertainty of the ADC 316 clock between duty cycles (e.g., between consecutive ON cycles). The estimated phase difference can then be used digitally by the modem 304 to shift the baseband data samples in time, thus compensating for the shift in phase of the ADC 316 clock. In this regard, both sampling and carrier frequency phases can be estimated and compensated for digitally, thus eliminating the need for reacquiring timing/frequency/phase information. In certain aspects, multiple of TDC modules 310 are deployed to operate in parallel but independently of one another. In this respect, multiple independent measurements of time/phase can be captured. As such, simple averaging or weighted averaging of the captured individual measurements may be used to calculate the final time/phase estimate to be used by the modem 304.

In certain aspects, the radio front-end 302 includes a module 334 separate from the TDC module 310, and the modem 304 includes modules 336 and 338. The TDC module 310 may be configured to perform time-to-digital conversion measurements while the module 334 is configured to determine the first and second time differences between the carrier frequency signal and the reference frequency signal. In turn, a module 336 of the modem 304 may be configured to convert the first time difference to the first corresponding phase value and the second time difference to the second corresponding phase value based on the operational clock cycle of the VCO 326, and a module 338 of the modem 304 may be configured to determine the phase difference between the first corresponding phase value and the second corresponding phase value. In this respect, the modem 304 may be configured to receive an indication of the operational frequency of the VCO 326 independent of the signal path (e.g., main I/Q receive path).

In some aspects, the TDC module 310 outputs the time-to-digital conversion measurements to the modem 304. In this respect, the modem 304 may be configured to determine the first and second time differences between the carrier frequency signal and the reference frequency signal, convert the first time difference to the first corresponding phase value and the second time difference to the second corresponding phase value based on the operational clock cycle of the VCO 326, and determine the phase difference between the first corresponding phase value and the second corresponding phase value to compensate for the phase uncertainty between duty cycles without any impact or disruption of the RX path or the PLL 308.

Figure 4:
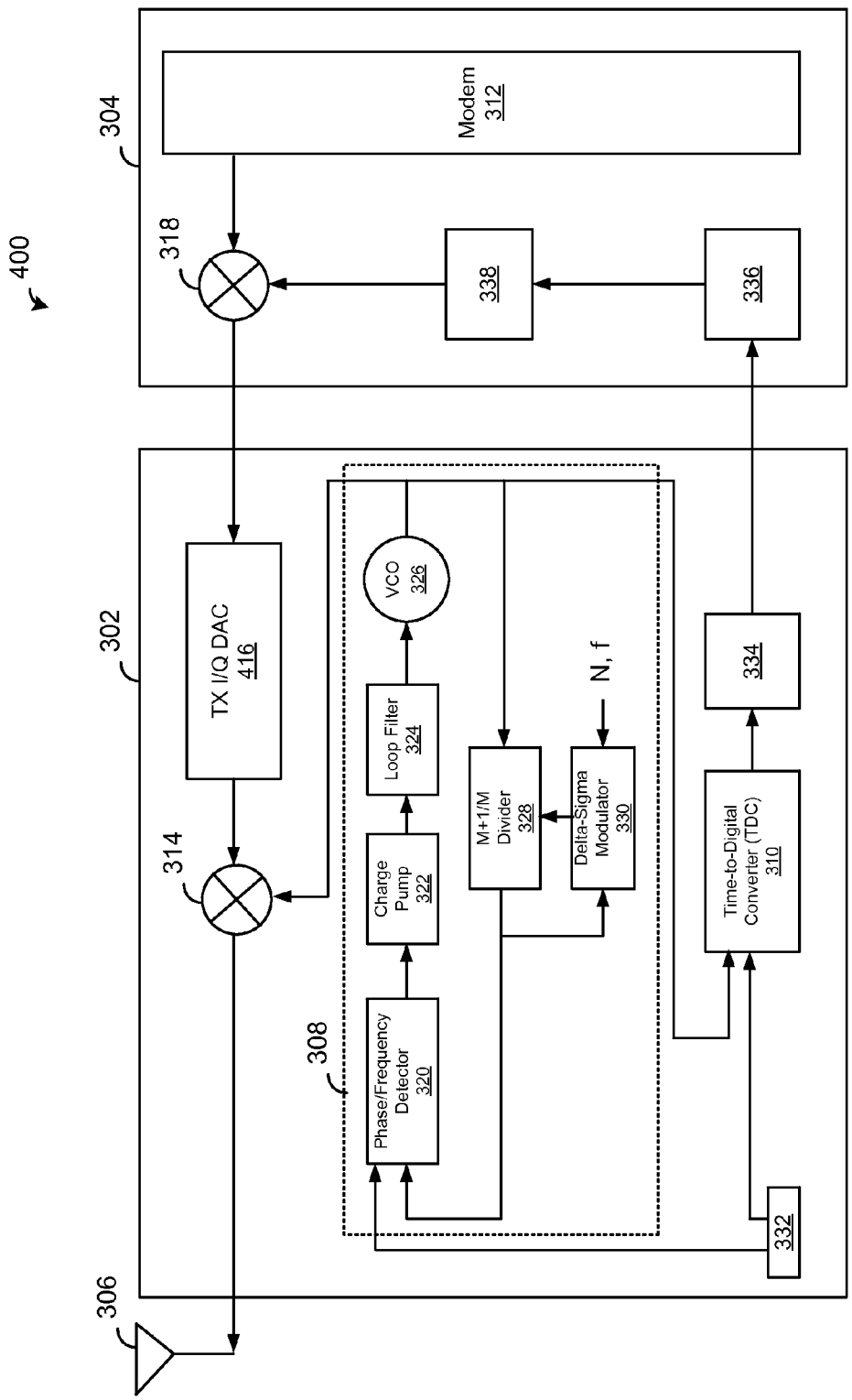
FIG. 4 is a block diagram illustrating an example of a transmitter with phase uncertainty compensation in accordance with one or more implementations.

FIG. 4 is a block diagram illustrating an example of a transmitter 400 with phase uncertainty compensation in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The transmitter 400 includes a radio frequency (RF) front-end 302, a modem and an antenna 306. The RF front-end 302 includes a PLL 308, a time-to-digital converter (TDC) 310, a mixer 314, a digital-to-analog converter (DAC) 416 and a crystal oscillator 332. The PLL 308 includes a phase/frequency detector 320, a charge pump 322, a loop filter 324, a voltage-controlled oscillator (VCO) 326, a frequency divider 328, and a modulator 330. The RF front-end 302 may include a power amplifier (PA) and/or a PA driver coupled to the PA in the signal path to the antenna 306. The modem 304 includes a standard modem 312 and a mixer 318 with the output of the mixer 318 coupled to the input of the DAC 416, and the input of the mixer 318 coupled to the output of the standard modem 312. Because transmitter 400 is substantially similar to receiver 300 of FIG. 3, only differences will be discussed with respect to FIG. 4.

The transmitter 400 includes the signal path carrying an outbound signal including I and Q component signals from the modem 304 for transmission via the antenna 306. In this regard, the outbound signal can be operable at baseband frequencies (e.g., 1 MHz). Each of the I and Q component signals is converted from the digital domain to the analog domain by the DAC 416. In some aspects, the RF front-end 302 includes a low-pass filter (not shown). In this respect, the analog version of the outbound signal is filtered through the low-pass filter to attenuate any frequency components of the respective component of the outbound signal that are present outside a defined bandwidth.

In some aspects, the output of the VCO 326 (e.g., the carrier frequency signal) becomes the RF carrier frequency used for up-conversion in the signal path from the modem 304 to the antenna 306. The modem 304 may be configured to provide a baseband signal that is up-converted (e.g., mixed with the carrier frequency signal) in the signal path to generate an outbound RF signal.

The PLL 308 produces the carrier frequency signal that is mixed (e.g., frequency-converted) with the filtered version of the outbound signal using the mixer 314. In one or more implementations, the output of the VCO 326 is divided by the frequency divider 328 to provide the up-conversion effect of the mixer 314. In this regard, the output of the VCO 326 can be adjusted by (M+1/M) to increase the conversion frequency. The output of the mixer 314 may be fed to the power amplifier driver and/or the power amplifier for amplification of the outbound signal, then output to the antenna 306.

As shown in FIG. 4, the TDC module 310 is configured to operate in parallel to the PLL 308 and the signal path. In this respect, the TDC module 310 output does not impact or interfere with the operation between the VCO 326 and the modem 304 since the TDC module 310 is configured to adjust the output of the standard modem 312 with the phase difference independent of the signal path through the DAC 416 to maintain phase continuity between the duty cycles. In this respect, measurements such as the arbitrary phase of the VCO 326 output can be taken at the start of each duty cycle (e.g., ON cycle) to determine any phase difference without any impact or disruption of the PLL 308 and/or the TX path through the DAC 416. The need of reacquiring the carrier phase and the sampling offset can be eliminated since any phase difference between duty cycles can be compensated for at the output of the standard modem 312 in parallel to the carrier tone generation of the PLL 308 via the TX path.

In certain aspects, the TDC module 310 is configured to perform time-to-digital conversion measurements while the module 334 of the RF front-end 302 is configured to determine the first and second time differences between the carrier frequency signal and the reference frequency signal. In turn, the module 336 of the modem 304 may be configured to convert the first time difference to the first corresponding phase value and the second time difference to the second corresponding phase value based on the operational clock cycle of the VCO 326, and the module 338 of the modem 304 may be configured to determine the phase difference between the first corresponding phase value and the second corresponding phase value. In this respect, the modem 304 may be configured to receive an indication of the operational frequency of the VCO 326 independent of the signal path (e.g., main I/Q receive path). In turn, the modem 304 may be configured to mix the phase difference received from the TDC module 310 with the outbound baseband signal that is output from the standard modem 312 via the mixer 318 as pre-compensation of the phase uncertainty between duty cycles.

Figure 5:
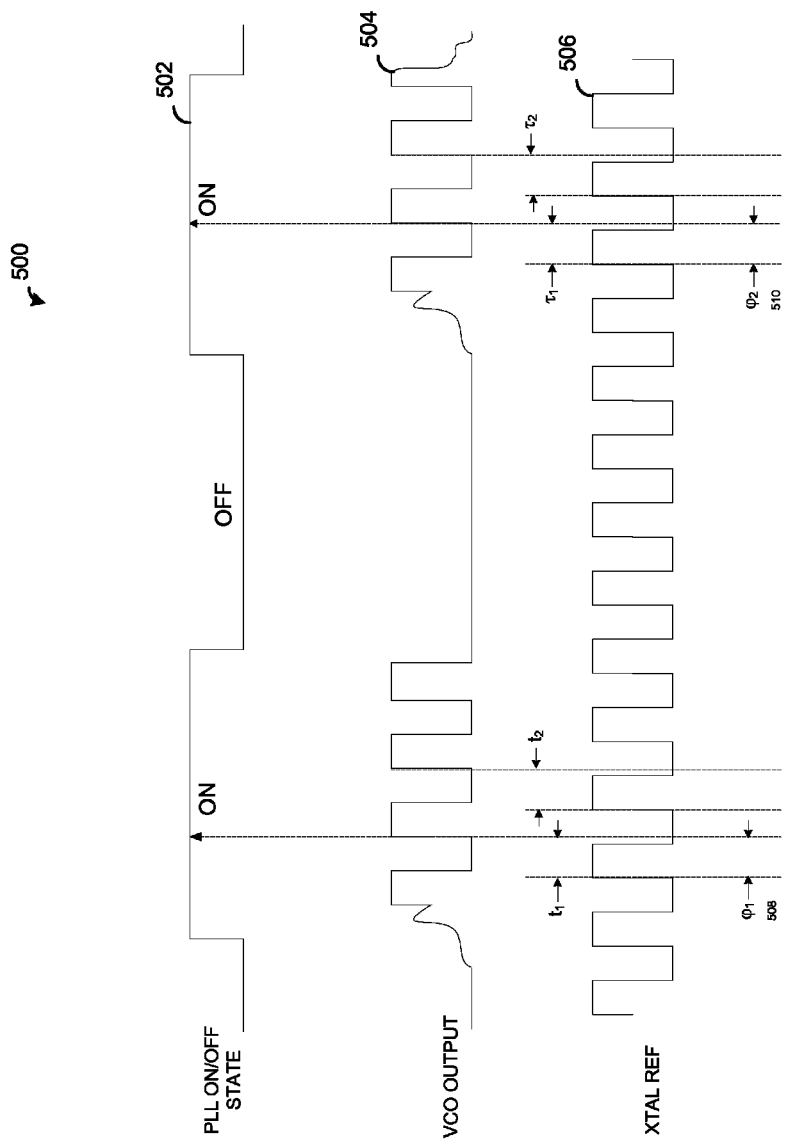
FIG. 5 illustrates an example of a timing waveform representing the phase uncertainty compensation in accordance with one or more implementations.

FIG. 5 illustrates an example of a timing waveform 500 representing the phase uncertainty compensation in accordance with one or more implementations. The timing waveform 500 includes a first waveform 502 representing the PLL 308 ON/OFF state, a second waveform 504 representing the VCO 326 output, and a third waveform 506 representing the reference frequency signal output of the reference clock generator 332.

Readings by the TDC module 310 are mapped into a corresponding phase number (effectively measuring RF carrier phase). By way of example, a phase reading 508 by the TDC module 310 based on time measurement $t_1$ (e.g., at end of a previous ON cycle) can be noted by $\phi(t_1)$. At the beginning of a current ON cycle (e.g., after the PLL 308 has switched on and the VCO 326 output settled to the operational frequency), a phase reading 510 by the TDC module 310 based on time measurement $t_2$ can be noted by $\phi(t_2)$. The phase readings can be expressed as:

$$\varphi = \frac{t}{T}(2\pi) \qquad (1)$$

where $\phi$ is the phase reading value, t is the time difference between the two clock signals (e.g., reference clock signal and carrier frequency signal), and T is the operational clock cycle of the VCO 326.

In some aspects, the difference between the first and second phase readings (e.g., $\phi(t_2)-\phi(t_1)$) is passed on to the modem 304. In certain aspects, the phase difference is determined at the modem 304. Based on the time difference (e.g., $t_2-t_1$) and operational frequency (or operational clock cycle) of the VCO 326, the phase difference (e.g., $\phi(t_2)-\phi(t_1)$) can be translated into an effective phase delta value (e.g., A) that is used to compensate for any phase difference between a current baseband signal associated with the current ON cycle and a previous baseband signal associated with the previous ON cycle at the input of the modem 304.

In certain aspects, multiple samples of the carrier frequency signal can be measured at several consecutive edges (e.g., positive clock transition) of the reference frequency signal. As shown in FIG. 5, the TDC module 310 may be configured to determine multiple first time differences between the carrier frequency signal and the reference frequency signal, where each of the first time measurements is determined at a respective clock transition of the reference frequency signal within the first ON cycle (or previous ON cycle). In this respect, the phase reading 508 may be based on an average of the first time measurements $t_1$ and $t_2$. Similarly, the phase reading 510 may be based on an average of the second time measurements $\tau_1$ and $\tau_2$.

In turn, the TDC module 310 may be configured to determine an average value between the first time measurements (e.g., $t_1$ and $t_2$), in which the corresponding phase value (e.g., phase reading 508) is based on the average value. In this respect, the phase reading 508 may be expressed as:

$$\varphi_1 = \frac{(t_1 + t_2)}{T}(2\pi) \qquad (2)$$

and the phase reading 510 may be expressed as:

$$\varphi_2 = \frac{(\tau_1 + \tau_2)}{T}(2\pi) \qquad (3)$$

In some aspects, the phase calculation/compensation is modified to apply to fractional PLL implementations. In fractional PLLs, the frequency of the VCO 326 may not be an integer multiple of the reference frequency signal but rather a fractional multiple of the reference frequency signal. As a result, the instantaneous phase of the VCO 326 output waveform with respect to the reference frequency waveform changes over time. This relative phase change is deterministic, and can be on a linear pattern versus time, where the slope is proportional to a fractional ratio of the VCO/reference frequencies. In fractional cases, the output of the TDC module 310 may be used to estimate an initial phase difference between the VCO and reference frequency waveforms (e.g., the second waveform 504 and the third waveform 506 respectively), while the slope of the phase difference over time is already known by a digital modem (e.g., the modem 304). As such, the phase difference between the last instance of an ON cycle and beginning of a next ON cycle based on fractional ratios of the VCO/reference frequencies can be calculated using a similar approach as shown in FIG. 5.

Figure 6:
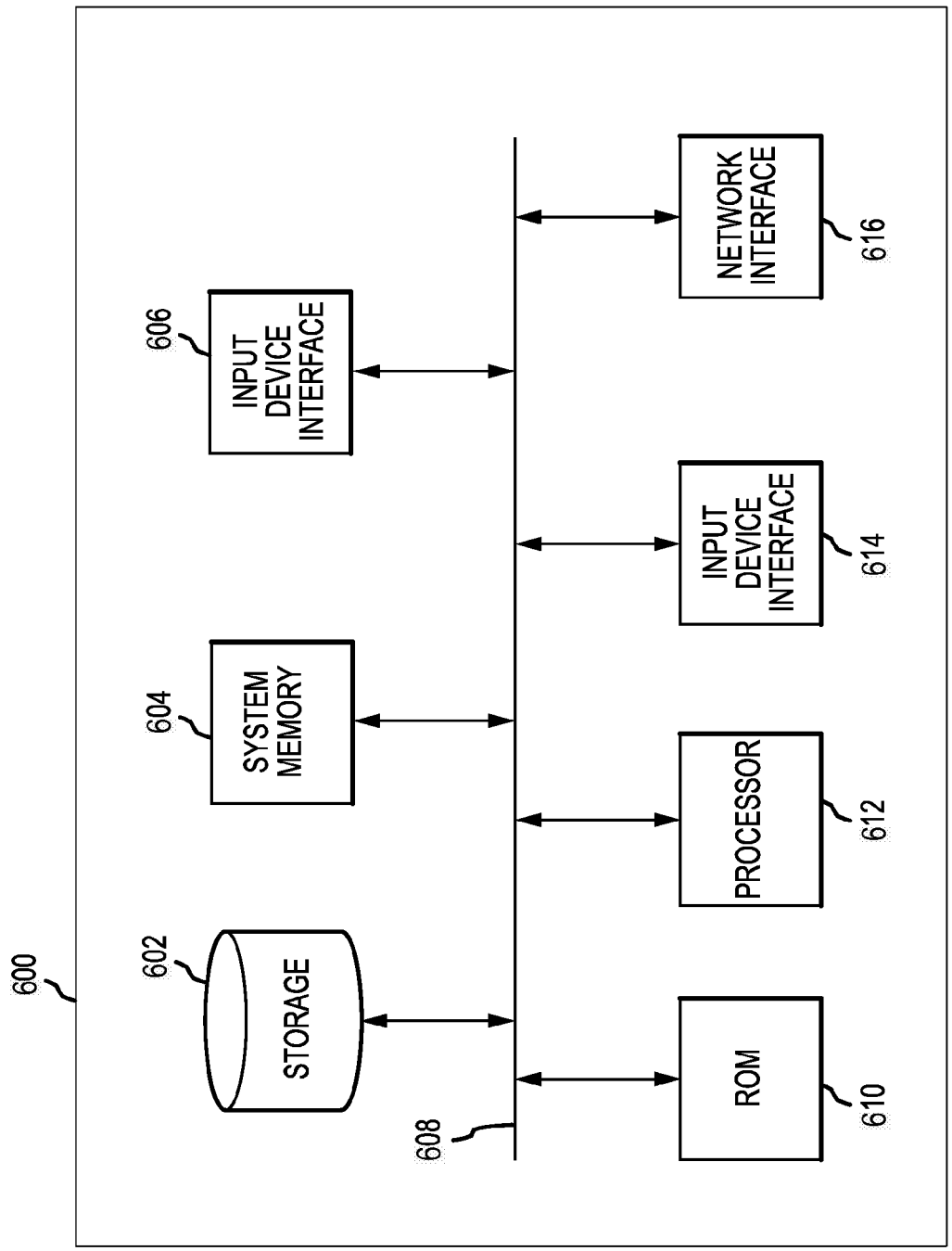
FIG. 6 conceptually illustrates an electronic system with which aspects of the subject technology may be implemented.

FIG. 6 conceptually illustrates an electronic system 600 with which one or more implementations of the subject technology may be implemented. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The electronic system 600, for example, can be a desktop computer, a laptop computer, a tablet computer, a server, a switch, a router, a base station, a receiver, a phone, a personal digital assistant (PDA), or generally any electronic device that transmits signals over a network. The electronic system 600 can be, and/or can be a part of wireless communication devices 118-132 (FIG. 1), receiver 300 (FIG. 3) and/or transmitter 400 (FIG. 4). Such an electronic system 600 includes various types of computer readable media and interfaces for various other types of computer readable media. The electronic system 600 includes a bus 608, one or more processing unit(s) 612, a system memory 604, a read-only memory (ROM) 610, a permanent storage device 602, an input device interface 614, an output device interface 606, a local area network (LAN) interface 616, and a wide area network (WAN) interface 618, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a flash drive or a universal serial bus (USB) drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

In some aspects, the electronic system 600 includes a computer program product with instructions stored in a tangible computer-readable storage medium such as permanent storage device 602. The instructions may include instructions for receiving a carrier frequency signal and a reference frequency signal, where the carrier frequency signal is mixed with a communication signal in a signal path; determining a first time difference between the carrier frequency signal and the reference frequency signal; determining a second time difference between the carrier frequency signal and the reference frequency signal; converting the first time difference to a first corresponding phase value and the second time difference to a second corresponding phase value based on an operational clock cycle of the VCO 326 (FIG. 3); determining a phase difference between the first corresponding phase value and the second corresponding phase value; and adjusting the communication signal independent of the signal path to maintain phase continuity between the duty cycles.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to a network (not shown) through the LAN interface 616 and separately, or jointly, through the WAN interface 618. In this manner, the electronic system 600 can be a part of a network of computers, such as a LAN through the LAN interface 616, a WAN through the WAN interface 618, an Intranet through either of the interfaces 616, 618, or a network of networks through either of the interfaces 616, 618, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method of compensating carrier tone generation between duty cycles, the method comprising:
   receiving a carrier frequency signal and a reference frequency signal, wherein the carrier frequency signal is mixed with a communication signal in a signal path;
   determining first and second time differences between the carrier frequency signal and the reference frequency signal, wherein the first time difference is determined during a first ON cycle, and wherein the second time difference is determined during a second ON cycle that is subsequent to the first ON cycle;
   converting the first time difference to a first corresponding phase value and the second time difference to a second corresponding phase value based on an operational clock cycle;
   determining a phase difference between the first corresponding phase value and the second corresponding phase value; and
   adjusting the communication signal with the phase difference independent of the signal path to maintain phase continuity in the signal path between the duty cycles.

2. The method of claim 1, wherein the first and second time differences are determined at respective clock transitions of the reference frequency signal.

3. The method of claim 1, wherein the first time difference is determined at an end of the first ON cycle and the second time difference is determined at a beginning of the second ON cycle.

4. The method of claim 1, further comprising:
determining a plurality of first time differences between the carrier frequency signal and the reference frequency signal, wherein each of the plurality of first time differences is determined at a respective clock transition of the reference frequency signal within the first ON cycle; and
determining a first average value between the plurality of first time differences, wherein the first corresponding phase value is based on the first average value.

5. The method of claim 4, further comprising:
determining a plurality of second time differences between the carrier frequency signal and the reference frequency signal, wherein each of the plurality of second time differences is determined at a respective clock transition of the reference frequency signal within the second ON cycle; and
determining a second average value between the plurality of second time differences, wherein the second corresponding phase value is based on the second average value.

6. The method of claim 1, wherein adjusting the communication signal with the phase difference comprises mixing the phase difference with the communication signal carried in the signal path.

7. A transceiver, comprising:
a phase-locked loop (PLL) configured to receive a reference frequency signal and output a carrier frequency signal based on the reference frequency signal, wherein the transceiver is configured to allow the carrier frequency signal to be mixed with a communication signal in a signal path; and
a time-to-digital converter (TDC) module coupled to the PLL, the TDC module configured to:
receive the carrier frequency signal and the reference frequency signal;
determine first and second time differences between the carrier frequency signal and the reference frequency signal;
convert the first time difference to a first corresponding phase value and the second time difference to a second corresponding phase value based on an operating frequency of the PLL;
determine a phase difference between the first corresponding phase value and the second corresponding phase value; and
adjust the communication signal with the phase difference independent of the signal path to maintain phase continuity in the signal path between duty cycles,
wherein the transceiver is configured to allow the first time difference to be determined during a first ON cycle and is configured to allow the second time difference to be determined during a second ON cycle that is subsequent to the first ON cycle.

8. The transceiver of claim 7, wherein the TDC module is configured to determine the first and second time differences with respect to respective clock transitions of the reference frequency signal.

9. The transceiver of claim 7, wherein the PLL comprises a voltage-controlled oscillator (VCO) configured to output the carrier frequency signal, and wherein the TDC module is coupled to an output of the VCO.

10. The transceiver of claim 7, wherein the TDC module is configured to:
determine a plurality of first time differences between the carrier frequency signal and the reference frequency signal, wherein each of the plurality of first time differences is determined at a respective clock transition of the reference frequency signal within the first ON cycle; and
determine a first average value between the plurality of first time differences, wherein the first corresponding phase value is based on the first average value.

11. The transceiver of claim 10, wherein the TDC module is configured to:
determine a plurality of second time differences between the carrier frequency signal and the reference frequency signal, wherein each of the plurality of second time differences is determined at a respective clock transition of the reference frequency signal within the second ON cycle; and
determine a second average value between the plurality of second time differences, wherein the second corresponding phase value is based on the second average value.

12. The transceiver of claim 7, further comprising:
a modem coupled to the PLL and configured to receive or transmit the communication signal in the signal path.

13. The transceiver of claim 7, wherein the transceiver is configured to allow the first difference to be determined at an end of the first ON cycle and the second time difference to be determined at a beginning of the second ON cycle.

14. A transceiver, comprising:
a phase-locked loop (PLL) configured to receive a reference frequency signal and provide a carrier frequency signal based on the reference frequency signal, wherein the transceiver is configured to allow the carrier frequency signal to be mixed with a communication signal in a signal path;
a modem coupled to the PLL and configured to receive or transmit the communication signal in the signal path; and
a time-to-digital converter (TDC) module coupled to the PLL and the modem, the TDC module configured to:
receive the carrier frequency signal from the PLL and the reference frequency signal;
determine first and second time differences between the carrier frequency signal and the reference frequency signal;
convert the first time difference to a first corresponding phase value and the second time difference to a second corresponding phase value based on an operating frequency of the PLL;
determine a phase difference between the first corresponding phase value and the second corresponding phase value; and
adjust the communication signal with the phase difference independent of the signal path to maintain phase continuity in the signal path between duty cycles,
wherein the transceiver is configured to cause the first time difference to be determined during a first ON cycle and is configured to cause the second time difference to be determined during a second ON cycle that is subsequent to the first ON cycle.

15. The transceiver of claim 14, wherein the TDC module is configured to determine the first and second time differences with respect to respective clock transitions of the reference frequency signal.

16. The transceiver of claim 14, wherein the PLL comprises a voltage-controlled oscillator (VCO) configured to output the carrier frequency signal, and wherein the TDC module is coupled to an output of the VCO.

17. The transceiver of claim 14, wherein the TDC module is configured to:
   determine a plurality of first time measurements between the carrier frequency signal and the reference frequency signal, wherein each of the plurality of first time measurements is determined at a respective clock transition of the reference frequency signal within the first ON cycle; and
   determine a first average value between the plurality of first time measurements, wherein the first corresponding phase value is based on the first average value.

18. The transceiver of claim 17, wherein the TDC module is configured to:
   determine a plurality of second time measurements between the carrier frequency signal and the reference frequency signal, wherein each of the plurality of second time measurements is determined at a respective clock transition of the reference frequency signal within the second ON cycle; and
   determine a second average value between the plurality of second time measurements, wherein the second corresponding phase value is based on the second average value.

19. The transceiver of claim 14, wherein the transceiver is configured to allow the first difference to be determined at an end of the first ON cycle and the second time difference to be determined at a beginning of the second ON cycle.

20. The transceiver of claim 14, wherein the modem is configured to receive the phase difference from the TDC module.

* * * * *